United States Patent
Wadas et al.

(10) Patent No.: US 6,220,219 B1
(45) Date of Patent: Apr. 24, 2001

(54) ENGINE SPEED CONTROL FOR DECREASING ENGINE SPEED

(75) Inventors: David L. Wadas; James M. Walker; Yei Dei Wang, all of Kalamazoo; Sharon L. Gualtieri, Schoolcraft, all of MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/504,426

(22) Filed: Feb. 15, 2000

(51) Int. Cl.$^7$ .................................................. F02D 41/14
(52) U.S. Cl. ............................................ 123/352; 701/110
(58) Field of Search ................................ 123/350, 352, 123/357; 701/110

(56) References Cited

U.S. PATENT DOCUMENTS

| | | | |
|---|---|---|---|
| 4,361,060 | 11/1982 | Smyth | 74/866 |
| 4,595,986 | 6/1986 | Daubenspeck et al. | 364/424.1 |
| 4,648,290 | 3/1987 | Dunkley et al. | 74/866 |
| 4,714,144 | * 12/1987 | Speranza | 123/352 |
| 4,754,665 | 7/1988 | Vandervoort | 74/745 |
| 4,850,236 | 7/1989 | Braun | 74/337 |
| 5,390,561 | 2/1995 | Stine | 74/331 |
| 5,457,633 | 10/1995 | Palmer et al. | 364/431.09 |
| 5,582,558 | 12/1996 | Palmeri et al. | 477/109 |
| 5,682,790 | 11/1997 | Genise | 74/335 |
| 5,729,110 | 3/1998 | Steeby et al. | 318/599 |
| 5,735,771 | 4/1998 | Genise | 477/111 |
| 5,738,606 | 4/1998 | Bellinger | 477/111 |
| 5,743,143 | 4/1998 | Carpenter et al. | 74/335 |
| 5,755,639 | 5/1998 | Genise et al. | 477/111 |
| 5,797,110 | 8/1998 | Braun et al. | 701/84 |
| 5,894,758 | 4/1999 | Walker | 74/335 |
| 5,904,635 | 5/1999 | Genise et al. | 477/111 |

\* cited by examiner

Primary Examiner—Andrew M. Dolinar
(74) Attorney, Agent, or Firm—Howard D. Gordon

(57) ABSTRACT

An improved control method/system for controlling engine speed (ES) of an electronically controlled engine (12) communicating over an industry standard data link. If the difference between engine speed and target engine speed exceeds a reference value (($ES-ES_{TARGET}$)>REF?), then the engine is commanded to operate in a torque control mode or a speed- and torque-limiting mode (64).

14 Claims, 4 Drawing Sheets

ENGINE SPEED CONTROL FOR DECREASING ENGINE SPEED

BACKGROUND OF THE INVENTION

1. Field of the Invention

The present invention relates to automatic control of engine speed in a fully or partially automated vehicular transmission system including an electronically controlled engine, preferably communicating over an electronic data link and allowing control in at least a speed-limiting mode and in a torque-limiting mode. In particular, the present invention relates to control of engine speed for such systems when a relatively large decrease in engine speed is required, typically when synchronizing for an upshift.

2. Description of the Prior Art

Fully and partially automated mechanical transmission systems intended for medium- and heavy-duty vehicular use are well known in the prior art, as may be seen by reference to U.S. Pat. Nos. 4,361,060; 4,595,986; 4,648,290; 4,850,236; 5,582,558; 5,735,771; 5,755,639; 5,797,110; 5,894,758 and 5,904,635, the disclosures of which are incorporated herein by reference. Such systems typically involve some automatic control of engine speed to synchronize for engaging a target gear ratio.

The current fully or partially automated transmission systems may include an electronically controlled engine having control logic conforming to and/or communicating over an electronic data link conforming to an industry standard protocol, such as SAE J-1922, SAE J-1939, ISO 11898 or the like. U.S. Pat. Nos. 5,457,633 and 5,738,606 are illustrative of such electronically controlled internal combustion (usually diesel) engines.

Such systems have an engine speed mode of operation wherein the engine is controlled to achieve a target engine speed. In heavy-duty diesel engines, the engines are programmed to respond to engine speed mode commands by fueling the engine to achieve the target engine speed in a smooth, ramped manner.

The prior art systems are subject to improvement, as when commanding a relatively large decrease in engine speed in the speed control mode of operation, usually during a single or skip upshift, a longer-than-desirable time may be required to achieve the target engine speed.

SUMMARY OF THE INVENTION

In accordance with the present invention, the drawbacks of the prior art are minimized or overcome by shortening the time required to achieve a relatively large decrease in engine speed to a target engine speed.

The foregoing is accomplished by operating in a torque control mode requesting a low torque, preferably zero torque, not in a speed control mode, when a significant decrease in engine speed is required. For the electronically controlled heavy-and medium-duty diesel engines produced by engine manufacturers, when in the torque control mode and when defueling to reduce torque, engine speed will decrease in an unmodulated manner according to the "decay rate" of the engine.

Accordingly, it is an object of the present invention to provide an improved engine speed control when substantial decreases in engine speed are required, such as in upshifts, which will decrease the time required to reach the desired engine speed.

This and other objects and advantages of the present invention will become apparent from a reading of the following description of the preferred embodiment taken in connection with the attached drawings.

DESCRIPTION OF THE PREFERRED EMBODIMENT

Figure 1:
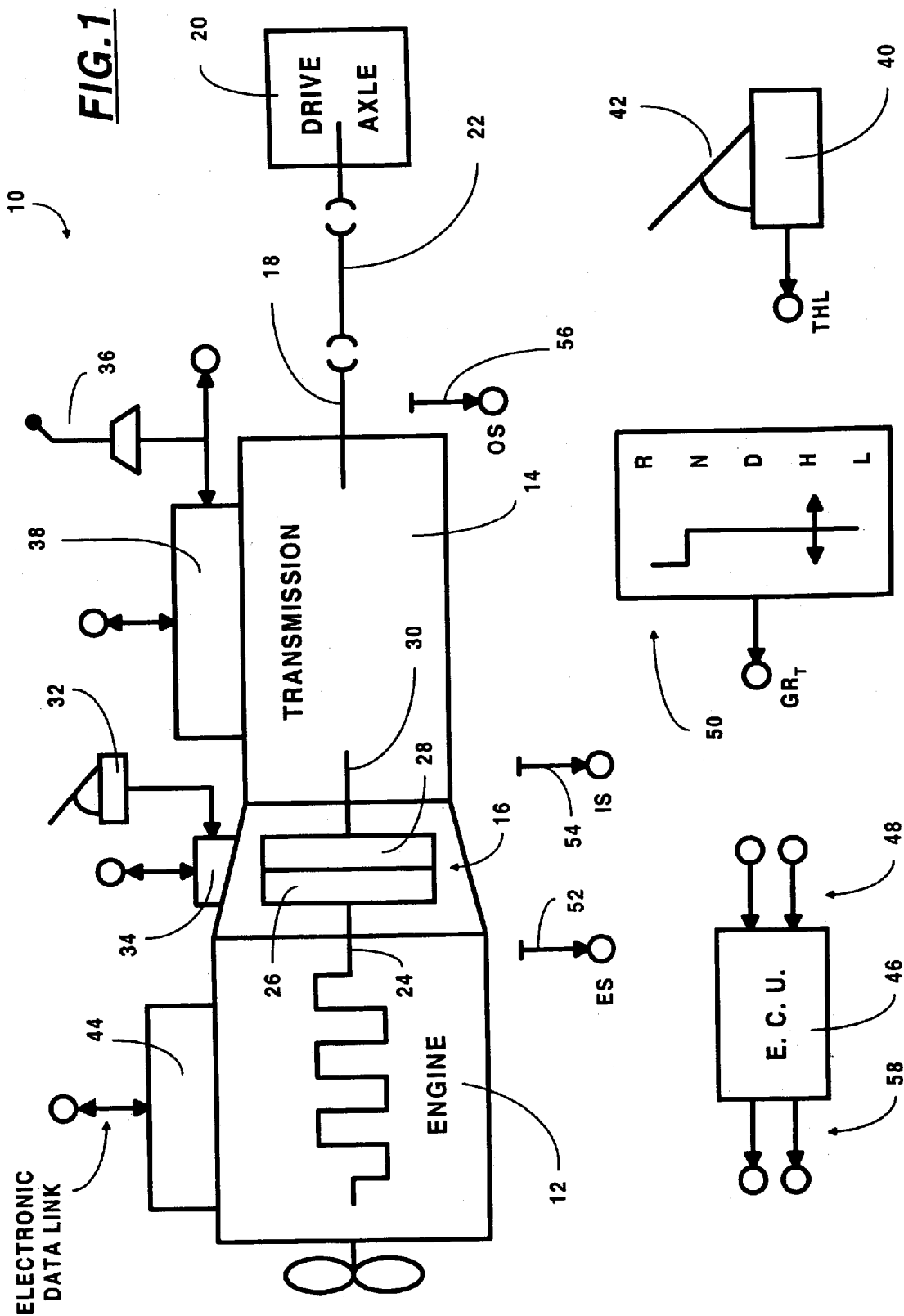
FIG. 1 is a schematic illustration of a vehicular automated mechanical transmission system of the type with which the improved engine speed control of the present invention is particularly advantageously utilized.

A typical vehicular powertrain 10 for a land vehicle, such as a heavy-duty or medium-duty truck, is schematically illustrated in FIG. 1. The powertrain 10 includes a well-known diesel engine 12 and a multiple-speed, change-gear mechanical transmission 14 drivingly connected to the engine by means of a master friction clutch 16 and having an output shaft 18 connected to a final drive (such as a drive axle) 20, by means of a prop shaft 22 and universal joints. The crankshaft 24 of the engine drives the input elements 26 of the master clutch 16, which are frictionally engageable to and disengageable from output elements 28 carried by the transmission input shaft 30. A manual 32 or automatic 34 control controls the engagement and disengagement of the master friction clutch 16. Transmission 14 is preferably a 9-to-18-forward-speed transmission controlled by a manual shift lever 36 or an automatically controlled X-Y shifter 38 acting on a shift bar housing or shift shaft mechanism.

Transmission 14 is preferably a compound-type transmission of the range, splitter or combined range-and-splitter type, as may be seen in greater detail by reference to U.S. Pat. Nos. 4,754,665 and 5,390,561, the disclosures of which are incorporated herein by reference. Preferably, transmission 14 is of the mechanical type in which speed ratios are engaged and disengaged by means of engaging and disengaging one or more jaw clutches, which are preferably but not necessarily of the non-synchronized type.

A throttle pedal monitor assembly 40 monitors the position or displacement of the throttle pedal 42 and provides a signal (THL) indicative thereof. The engine includes a controller, preferably a microprocessor-based controller 44, which communicates over an electronic data link and is effective to fuel the engine in accordance with commands over the data link. Typically, commands will request fueling to match operator throttle settings or to achieve a required engine speed and/or provide a maximum output (ie., flywheel) torque.

A microprocessor-based system controller 46 receives input signals 48 from the throttle pedal position sensor 40, the transmission shift actuator 38, signal GRT, from the driver command console 50, signal ES indicative of engine speed from sensor 52, signal IS from input shaft speed sensor 54, and/or signal OS from output shaft speed sensor 56. The input signals also may include a signal from the clutch actuator 34 indicative of the engaged or disengaged condition of master clutch 16 and/or the transmission operator 38. X-Y shift mechanisms and shift position sensors may be seen by reference to U.S. Pat. Nos. 5,729,110 and 5,743,143. The system controller will process these input signals in accordance with predetermined logic rules to issue command output signals 58 to various system actuators, including the engine controller 44. In certain systems, ECU 46 may be integral with the engine controller 44.

As is well known, electronically controlled, heavy-duty diesel engines conforming to industry standard protocols such as SAE J-1922 and/or SAE J-1939 will receive and obey commands to operate in at least four different modes:

(1) a mode wherein engine fueling is under control of the vehicle operator and the engine will be fueled in accordance with the operator's positioning of the throttle pedal 42;

(2) an engine speed control mode wherein the engine will be fueled to achieve a commanded engine speed;

(3) a torque control mode wherein the engine will be fueled such that engine torque will achieve a requested maximum engine torque; and (4) a speed- and torque-limiting mode wherein the engine is fueled such that engine speed and engine torque will not exceed requested maximum values thereof.

Torque usually is requested as a percentage of the maximum rated gross, output or other torque rating of the engine.

To complete a desired single or skip upshift by engaging non-synchronized jaw clutches, it is required that the engine speed be lowered to a substantially synchronous value ($ES_{TARGET}=(OX \times GR_T) \pm X$). See, for example, U.S. Pat. No. 5,682,790, the disclosure of which is incorporated herein by reference.

Figure 2:
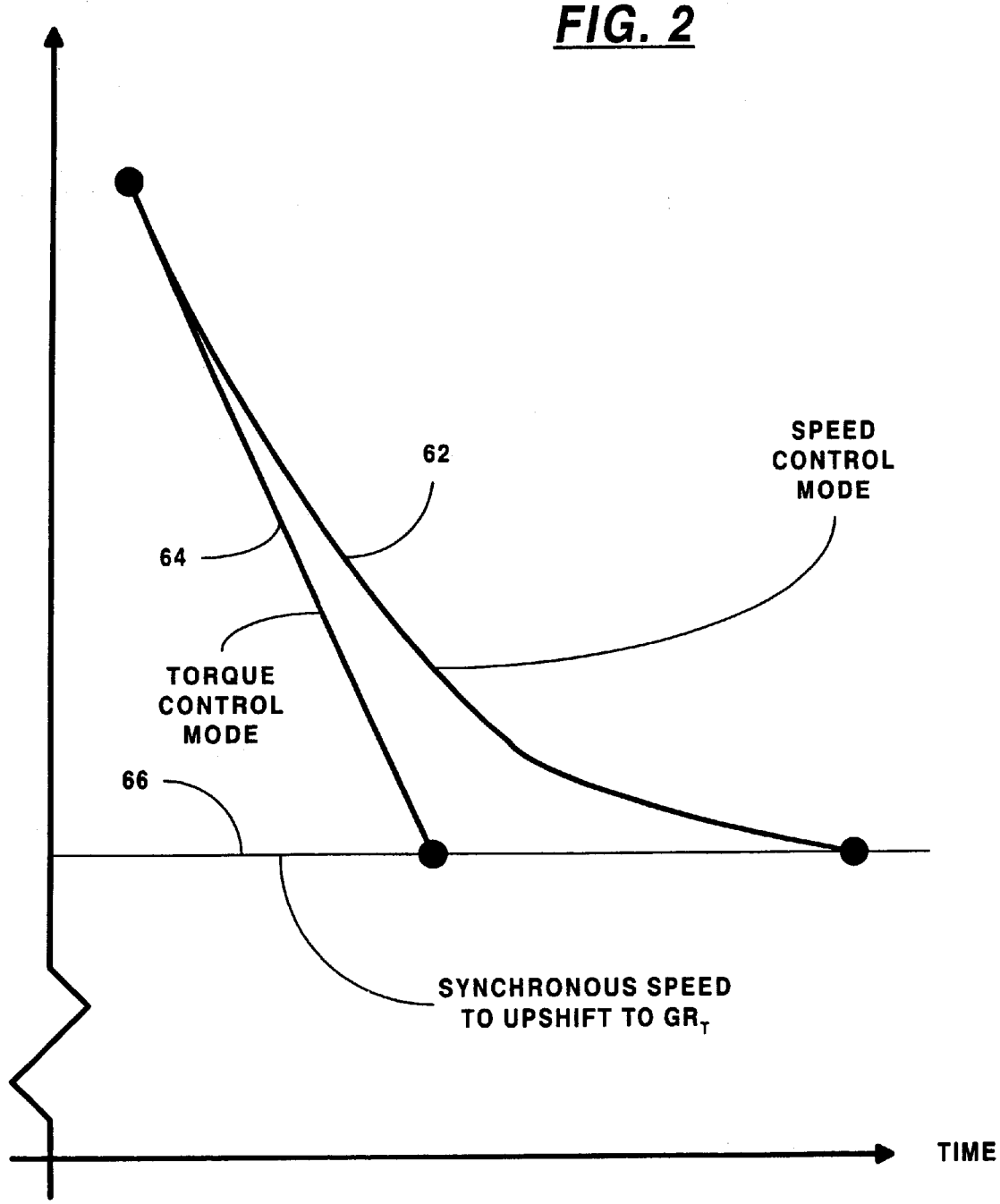
FIG. 2 is a graphical representation of the rate of decrease in engine speed in a speed control mode versus a torque control mode of a typical heavy-duty diesel engine operating under an industry standard data link protocol such as SAE J-1922 or SAE J-1939.

In the prior art automated mechanical transmission systems, when it was necessary to significantly reduce engine speed to synchronize for engaging an upshift target gear ratio, the engine was commanded to operate in the engine speed control mode to achieve the target engine speed ($ES=ES_{TARGET}$). The engine then would implement the governor control required to reach this desired speed. The engine deceleration rate that occurs is dependent upon the engine manufacturer's implementation of the speed control mode and can sometimes be undesirably slow, as the implementation attempts to smoothly ramp to the target engine speed. "Ramped" is used to mean a modulated rate of deceleration less than the rate of unmodulated engine deceleration. Line 62 in FIG. 2 schematically illustrates a typical response in the engine speed control mode to decrease engine speed to the desired engine speed to engage the target gear ratio.

Figure 3:
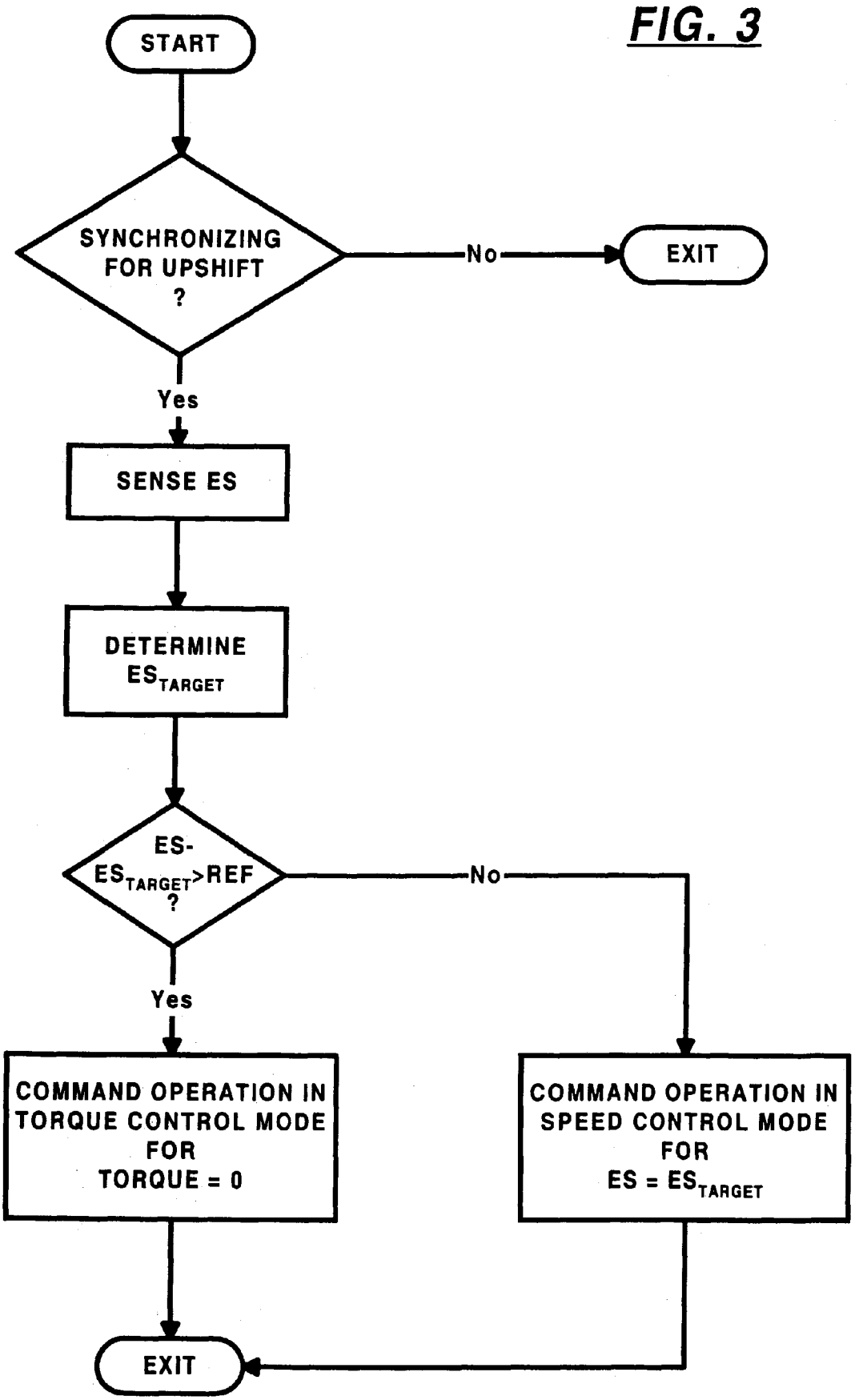
FIG. 3 is a schematic illustration, in flow chart format, of the engine speed control of the present invention.

According to the present invention, Applicants have discovered that when a significant decrease in engine speed is required, by using the torque control mode or the speed- and torque-limiting mode and requesting that maximum torque to set to a relatively low value (such as zero torque), the engine will decelerate toward the desired engine speed as quickly as possible without any attempt by the engine controller to smoothly ramp the value. This will assure that the maximum engine deceleration rate is obtained and shorten the time to complete an upshift. Line 64 in FIG. 2 schematically illustrates engine speed in the torque control mode with a zero torque command. A similar line would be seen in the speed- and torque-limiting mode of operation. As the speeds of the engaging jaw clutch members pass through synchronous, the jaw clutch members will engage. This is especially true for engaging splitter clutches, which do require precision to engage. FIG. 3 is a schematic illustration, in flow chart format, of the upshift engine speed control method of the present invention. This is less desirable, as the system may cause engine speed to "chase" torsional vibrations in the driveline.

Figure 4:
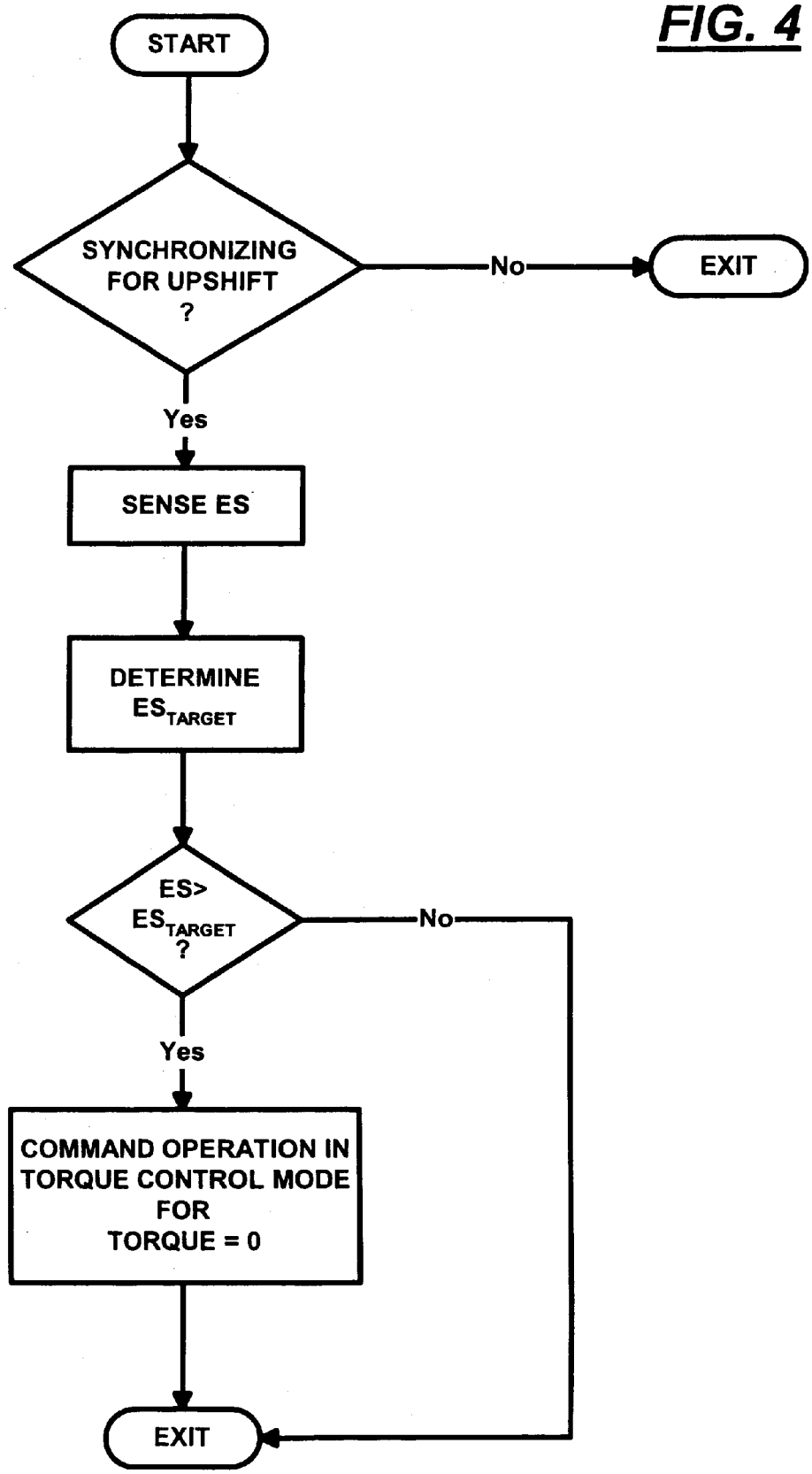
FIG. 4 is a schematic illustration, in flow chart format, of an alternate embodiment of the present invention.

In another alternative mode, illustrated in FIG. 4, whenever current engine speed exceeds target engine speed ($ES>ES_{TARGET}$), operation in the torque control mode or the speed- and torque-limiting mode may be commanded.

Alternatively, as engine speed approaches within a relatively narrow band (about ±10–20 RPM) of the target synchronous speed 66, the engine then may be commanded to operate in the engine speed control mode and to achieve the exact target engine speed.

Although the present invention has been described with a certain degree of particularity, it is understood that the description of the preferred embodiment is by way of example only and that numerous changes to form and detailed are possible without departing from the spirit and scope of the invention as hereinafter claimed.

We claim:

1. A method for controlling engine speed in an automated transmission system including an electronically controlled engine having (i) a speed control mode of operation wherein the engine is fueled to cause engine speed to equal a desired engine speed value ($ES_{TARGET}$) in a ramped manner and (ii) at least one of (a) a torque control mode of operation wherein the engine is fueled to cause engine torque to be a requested engine torque value and engine deceleration is not modulated, and (b) a speed- and torque-limiting mode wherein the engine is fueled to cause engine torque to be no greater than a requested engine torque value and engine deceleration is not modulated, said method characterized by the steps of:

sensing current engine speed (ES);

determining a desired engine speed ($ES_{TARGET}$); and if the difference between current and desired engine speed exceeds a first reference value (($ES\ ES_{TARGET}$)>$REF_1$), commanding operation in one of said torque control mode of operation to cause torque to equal a minimal engine torque value and said speed- and torque-limiting mode of operation to limit torque to a minimal engine torque value.

2. The method of claim 1 including the further step of:

if a change in engine speed is required and the difference between current and desired engine speed is less than said first reference value (($ES-ES_{TARGET}$)<$REF_1$), commanding operation in said speed control mode of operation to cause engine speed to equal a required engine speed.

3. The method of claim 1 wherein said minimal torque value is about zero torque.

4. The method of claim 1 wherein said engine includes a microprocessor-based engine controller communicating over an electronic data link.

5. The method of claim 4 wherein said data link conforms to an industry standard protocol corresponding to one of SAE J-1922, SAE J-1939 and/or ISO 11898.

6. The method of claim 1 wherein said reference value is about 10–20 RPM.

7. A control system for controlling engine speed in an automated transmission system including an electronically controlled engine, a microprocessor-based engine controller communicating over an electronic data link and including logic rules having (i) a speed control mode of operation wherein the engine is fueled to cause engine speed to equal a desired engine speed value ($ES_{TARGET}$) in a ramped manner and (ii) at least one of (a) a torque control mode of operation wherein the engine is fueled to cause engine torque to be a requested engine torque value and engine deceleration is not modulated, and (b) a speed- and torque-limiting mode wherein the engine is fueled to cause engine torque to be no greater than a requested engine torque value and engine deceleration is not modulated, said control system characterized by said engine controller including logic rules for:

sensing current engine speed (ES);

determining a desired engine speed ($ES_{TARGET}$); and if the difference between current and desired engine speed exceeds a first reference value (($ES\ ES_{TARGET}$)>$REF_1$), commanding operation in one of said torque control mode of operation to cause torque to equal a minimal engine torque value and said speed- and torque-limiting mode of operation to limit torque to a minimal engine torque value.

8. The control system of claim 7 wherein said logic rules are effective:

if a change in engine speed is required and the difference between current and desired engine speed is less than said first reference value (($ES-ES_{TARGET}$)<$REF_1$), commanding operation in said speed control mode of operation to cause engine speed to equal a required engine speed.

9. The control system of claim 7 wherein said minimal torque value is about zero torque.

10. The control system of claim 7 wherein said data link conforms to an industry standard protocol corresponding to one of SAE J-1922, SAE J-1939 and/or ISO 11898.

11. The control system of claim 7 wherein said reference value ($REF_1$) is about 10–20 RPM.

12. A method for controlling engine speed in an automated transmission system including an electronically controlled engine having (i) a speed control mode of operation wherein the engine is fueled to cause engine speed to equal a desired engine speed value ($ES_{TARGET}$) in a ramped manner and (ii) at least one of (a) a torque control mode of operation wherein the engine is fueled to cause engine torque to be a requested engine torque value and engine deceleration is not modulated, and (b) a speed- and torque-limiting mode wherein the engine is fueled to cause engine torque to be no greater than a requested engine torque value and engine deceleration is not modulated, said method characterized by the steps of:

sensing current engine speed (ES);

determining a desired engine speed ($ES_{TARGET}$); and if current engine speed exceeds desired engine speed ($ES>ES_{TARGET}$), commanding operation in one of said torque control mode of operation to cause torque to equal a minimal engine torque value and said speed- and torque-limiting mode of operation to limit torque to a minimal engine torque value.

13. The method of claim 12 wherein said minimal torque value is about zero torque.

14. The method of claim 13 wherein said engine includes a microprocessor-based engine controller communicating over an electronic data link.

* * * * *